United States Patent
Burns et al.

(10) Patent No.: US 10,801,390 B2
(45) Date of Patent: Oct. 13, 2020

(54) VEHICLE EXHAUST SYSTEM

(71) Applicant: Nissan North America, Inc., Franklin, TN (US)

(72) Inventors: Tyler Burns, Farmington Hills, MI (US); Amarendra Kumar, Farmington Hills, MI (US); Jeffery Mazur, New Baltimore, MI (US)

(73) Assignee: Nissan North America, Inc., Franklin, TN (US)

( * ) Notice: Subject to any disclaimer, the term of this patent is extended or adjusted under 35 U.S.C. 154(b) by 190 days.

(21) Appl. No.: 16/022,305

(22) Filed: Jun. 28, 2018

(65) Prior Publication Data

US 2020/0003106 A1 Jan. 2, 2020

(51) Int. Cl.

| | |
|---|---|
| *F01N 13/18* | (2010.01) |
| *F01N 13/08* | (2010.01) |
| *F01N 13/16* | (2010.01) |
| *B60K 13/04* | (2006.01) |

(52) U.S. Cl.
CPC ....... *F01N 13/1816* (2013.01); *F01N 13/082* (2013.01); *F01N 13/16* (2013.01); *B60K 13/04* (2013.01); *F01N 2530/18* (2013.01)

(58) Field of Classification Search
CPC .... F01N 13/1816; F01N 13/082; F01N 13/16; F01N 13/1822; F01N 2340/04; F01N 13/20; F02M 35/16; B60K 13/04; B60K 13/06
See application file for complete search history.

(56) References Cited

U.S. PATENT DOCUMENTS

| | | | |
|---|---|---|---|
| 7,686,131 B1* | 3/2010 | Osterkamp | ........... F01N 13/001 |
| | | | 180/89.2 |
| 9,145,819 B2* | 9/2015 | O'Brien | .................. F01N 13/10 |
| 9,157,556 B2* | 10/2015 | Quinlan | ................ F01N 13/082 |
| 9,328,649 B2* | 5/2016 | Kieslich | ................ F01N 13/082 |
| 10,150,438 B2* | 12/2018 | Baluch | .................... B60R 19/48 |
| 10,344,658 B2* | 7/2019 | Minowa | ................ F01N 13/082 |
| 2008/0093160 A1 | 4/2008 | Fritz | |

(Continued)

FOREIGN PATENT DOCUMENTS

| | | |
|---|---|---|
| DE | 102016106820 A1 | 8/2017 |
| FR | 3013283 A1 | 5/2015 |

(Continued)

*Primary Examiner* — Faye M Fleming
(74) *Attorney, Agent, or Firm* — Global IP Counselors, LLP (57) ABSTRACT

A vehicle exhaust system includes a vehicle body structure, an exhaust system, a rear bumper assembly, an exhaust finisher and a boot. The exhaust assembly is supported to an underside of the vehicle body structure. The rear bumper assembly is also supported to the vehicle body structure. The exhaust finisher is non-movably attached to one of the vehicle body structure and the rear bumper assembly. The exhaust finisher extends at least part way through an opening of the rear bumper assembly. The boot has a first end, a second end, and a flexible portion. The first end is attached to a rear end of the exhaust assembly. The second end is attached to a forward end of the exhaust finisher and the flexible portion extends from the trout end to the second end. The flexible portion is elastically deformable in response to thermal expansion and contraction of the exhaust assembly.

16 Claims, 11 Drawing Sheets

(56) References Cited

U.S. PATENT DOCUMENTS

| | | | |
|---|---|---|---|
| 2010/0096865 A1* | 4/2010 | McKee | B60K 13/02 |
| | | | 293/113 |
| 2014/0158460 A1 | 6/2014 | Park et al. | |
| 2014/0311609 A1 | 10/2014 | Nowka et al. | |
| 2014/0374514 A1 | 12/2014 | Kieslich | |
| 2016/0208671 A1 | 7/2016 | Nowka et al. | |

FOREIGN PATENT DOCUMENTS

| | | |
|---|---|---|
| JP | 2004-308551 A | 11/2004 |
| JP | 2006-316705 A | 11/2006 |
| JP | 2012-112288 A | 6/2012 |
| JP | 2014-144740 A | 8/2014 |
| WO | 2013113894 A1 | 8/2013 |

* cited by examiner

VEHICLE EXHAUST SYSTEM

BACKGROUND

Field of the Invention

The present invention generally relates to a vehicle exhaust system; More specifically, the present invention relates to a vehicle exhaust system that includes an exhaust finisher with a flexible boot connecting a rear end of an exhaust pipe to a forward end of the exhaust finisher.

Background Information

Many vehicles include an exhaust finisher that extends through an opening or recess in a rear bumper fascia. The exhaust finisher is often directly attached or non movably supported to the rear bumper. A rear end of an exhaust pipe extends into an oversized opening defines at a forward end of the exhaust finisher such that the exhaust pipe is movable relative to the exhaust finisher.

SUMMARY

One object of the present disclosure is to provide a flexible connection between a rear end a an exhaust pipe and a forward end of an exhaust finisher.

Another object of the present disclosure is to provide a flexible boot connected to rear end of an exhaust pipe and a forward end of an exhaust finisher, with the flexible boot allowing movement of the exhaust pipe relative to the exhaust finisher where the movement is a result of thermal expansion and contraction of the exhaust pipe or from relative movement between the exhaust pipe and the exhaust finisher resulting from, for example, rough road conditions.

In view of the state of the known technology, one aspect at the present disclosure is to provide a vehicle exhaust system with an exhaust assembly, a boot and an exhaust finisher. The exhaust finisher is fixedly and non-movably attached to one of a vehicle body structure and a rear bumper assembly. The exhaust finisher extends at least part way through an opening of the rear bumper assembly. The boot has a first end, a second end and a flexible portion. The first end is attached to a rear end of an exhaust pipe of the exhaust assembly. The second end is attached to a forward end of the exhaust finisher. The flexible portion extends from the front end to the second end. The flexible portion is elastically deformable in response to thermal expansion and contraction of the exhaust assembly.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only wand not for the purpose of limiting the invention as defined by the appended claims and their equivalents.

Figure 1:
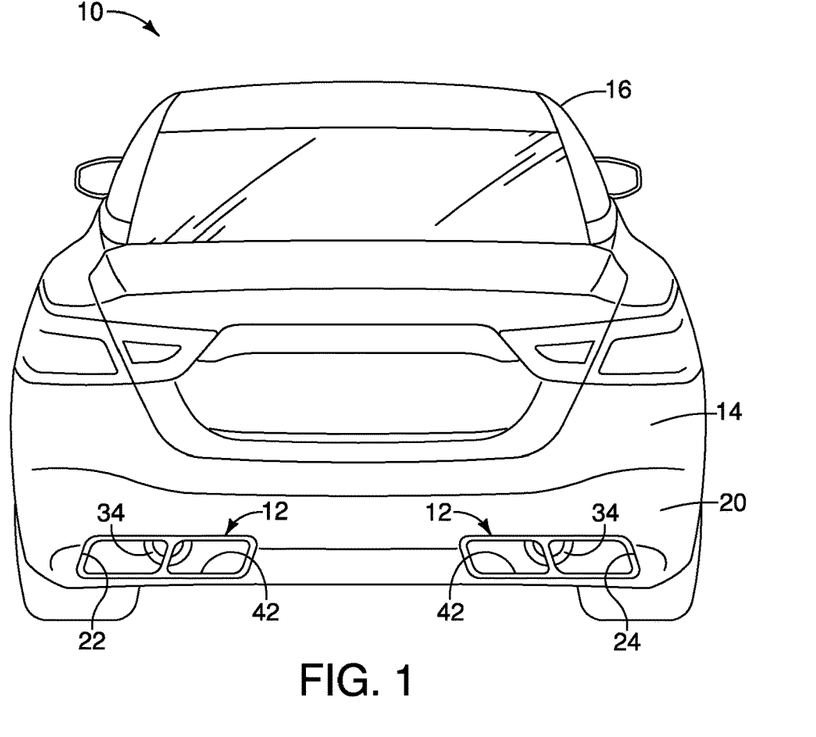
FIG. 1 is a rear view of a vehicle showing a bumper fascia with two exhaust finishers in accordance with a first embodiment.

Referring initially to FIG. 1, a vehicle 10 having an exhaust finisher 12 installed to a rear end 14 of a vehicle body structure 16 of the vehicle 10, is illustrated in accordance with a first embodiment.

Figure 2:
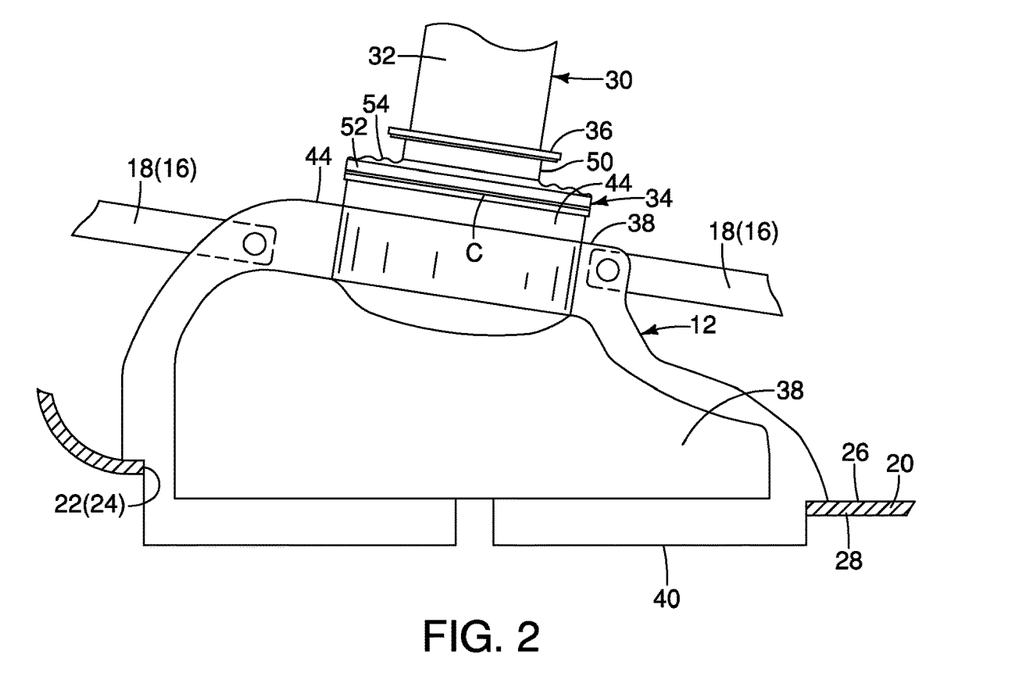
FIG. 2 is a top view of one of the exhaust finishers removed from the vehicle showing a boot attached to a rear end of the exhaust pipe and a forward (or front) end of the exhaust finisher in accordance with the first embodiment.

The rear end 14 of the vehicle body structure 16 includes a bumper structure 18 (shown in FIG. 2) that is concealed by a rear bumper fascia 20. The rear bumper fascia 20 defines at least one opening 22 and optionally a second, opening 24. In the depicted embodiment, the rear bumper fascia 20 includes both the opening 22 and the opening 24, As shown in FIG. 2, the opening 22 (and the opening 24) extends from an inboard surface 26 (a forward-facing surface) to an outboard surface 28 (a rearward facing surface).

Figure 3:
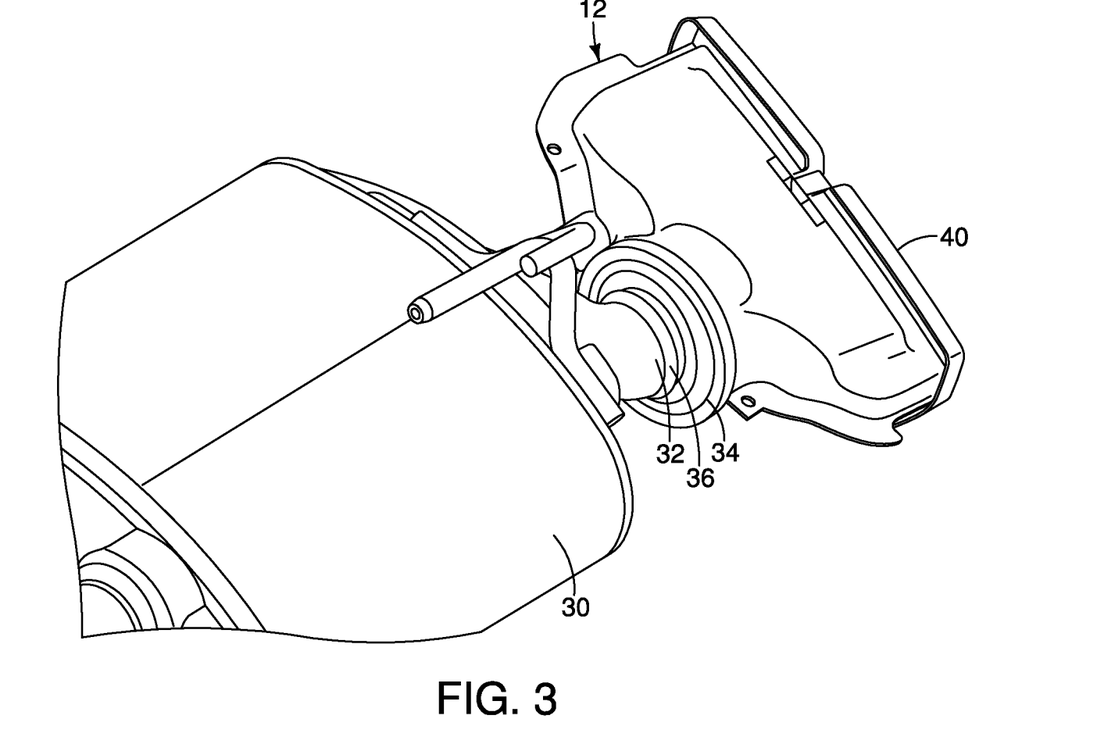
FIG. 3 is a perspective view of a portion of an exhaust system and the exhaust finisher removed from the vehicle further showing the boot attached to the rear end of the exhaust pipe and the forward end of the exhaust finisher in accordance with the first embodiment.
Figure 4:
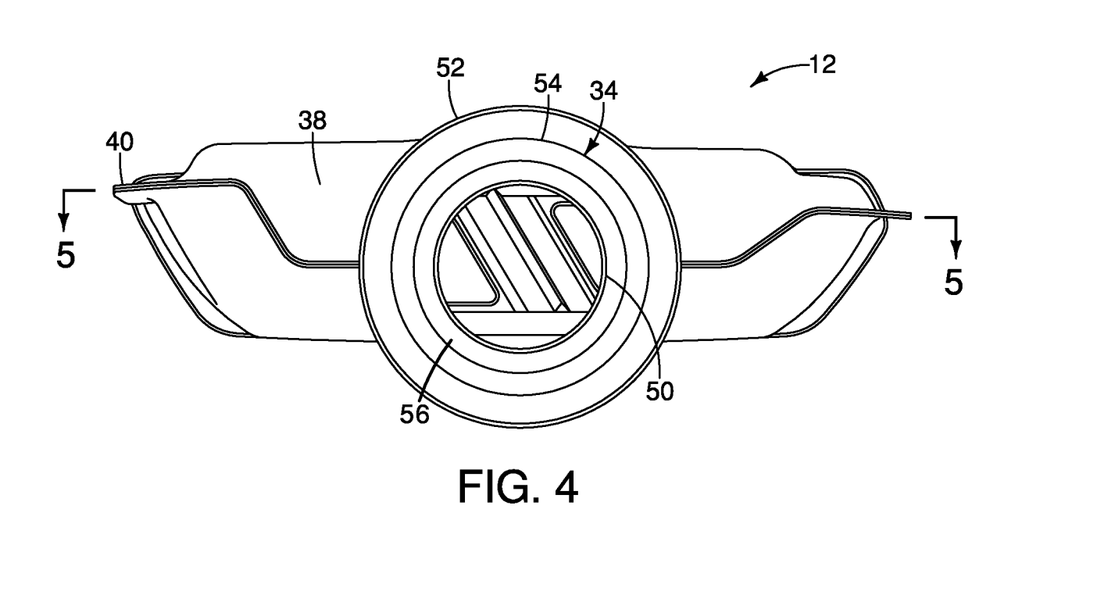
FIG. 4 is a front view of the exhaust finisher assembly showing the boot and a housing of the exhaust finisher in accordance with the first embodiment.

The vehicle 10 also includes an exhaust system 30 that is installed beneath the vehicle body structure 16 in a conventional manner. As shown in FIG. 3, the exhaust system 30 includes at least one exhaust pipe 32 that extends rearward toward the rear bumper fascia 20 and toward the exhaust finisher 12.

It should be understood from the drawings and the description herein that the vehicle 10 depicted in the drawings can include two separate exhaust systems 30 and two corresponding exhaust finishers 12. Since the two separate exhaust systems 30 and the two corresponding exhaust finishers 12 are basically identical, except that they are symmetrically mirror images of one another, description of only one exhaust system 30 and only one exhaust finishers 12 is provided herein below for the sake of brevity. It should be understood that description of one of the exhaust systems 30 applies equally to both, and description of one of the exhaust finishers 12 applies equally to both.

The exhaust pipe 32 is connected to the exhaust finisher 12 via a boot 34, as is described in greater detail below.

The exhaust finisher 12 is fixedly and non-movably attached to one of the vehicle body structure 16 and a portion of the rear bumper assembly 18 (including the rear bumper fascia 20). The exhaust finisher 12 extends at least part way through the opening 22 the rear bumper fascia 20 of the rear bumper assembly 18. Since rear bumper assemblies, including bumper fascias, are conventional vehicle structures, further description of the elements and structures of a rear bumper assembly are omitted for the sake of brevity.

The exhaust pine 32 defines a rear end of the exhaust assembly 30. The exhaust pipe 32 includes a first annular flange 36 that extends radially outward therefrom, as shown in FIGS. 2, 3, 5 and 6.

Figure 5:
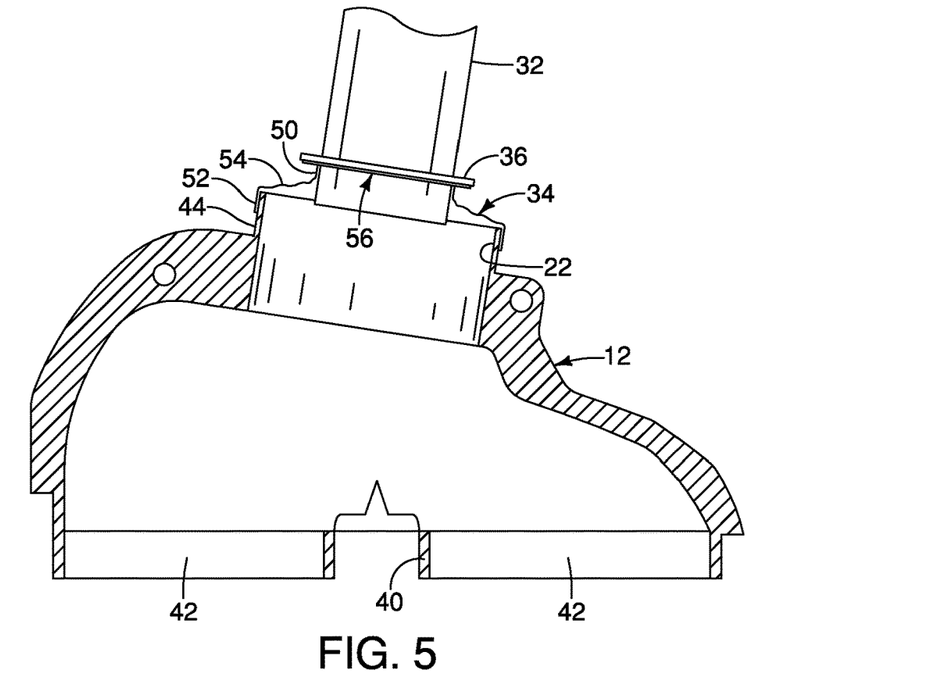
FIG. 5 is a cross-sectional top view of the exhaust finisher showing the rear end of the exhaust pipe and the boot at an ambient temperature in accordance with the first embodiment.
Figure 6:
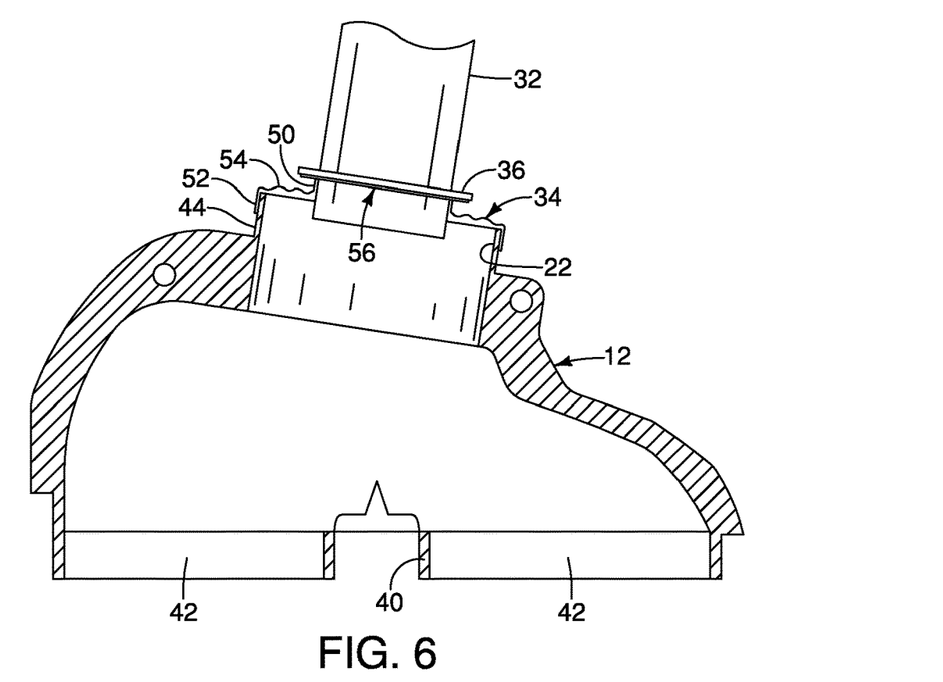
FIG. 6 is another cross-sectional top view of the exhaust finisher similar to FIG. 5 showing the rear end of the exhaust pipe having undergone thermal expansion (elongation) and the boot at an engine operating temperature in accordance with the first embodiment.

The exhaust finisher 12 includes a forward end 38 that is hidden by the bumper fascia 20, as viewed in FIG. 1. A rearward end 40 of the exhaust finisher 12 extends rearward out of the opening 22 of the bumper fascia 20. The rearward end 40 includes two rear openings 42, as shown in FIGS. 5 and 6. The forward end 38 includes a cylindrically shaped projection 44 (also referred to as a tube end 44).

The boot 34 includes a first end 50, a second end 52, and a flexible portion 54, as shown in FIGS. 5-10. The boot 34 is made of one of a group selected from the following materials: a sheet metal material, a metallic foil material and a flexible heat resistant polymer material. The first end 50, the second end 52 and the flexible portion 54 of the boot 34 are made as a single, unitary, monolithic element.

The first end 50 of the boot 34 has a circular or cylindrical shape defining a first diameter $D_1$. The first end 50 is configured to attach to the exhaust pipe 32 via any of a variety of fastening structures. The first end 50 of the boot 34 includes a second annular flange 56 that extends radially outward therefrom. The first annular flange 36 and the second annular flange 56 are dimensioned to mate with one another. The first annular flange 36 and the second annular flange 56 can be fixed to one another via mechanical fasteners (not shown), such as screws, staples or rivets. Alternatively, the first annular flange 36 and the second annular flange. 56 can be welded to one another. Further alternative attachment configurations are described further below.

The second end 52 of the boot 34 has a circular or cylindrical shape defining a second diameter $D_2$, with the second diameter $D_2$ being larger than the first diameter $D_1$, as shown in FIGS. 7-10. The second end 52 is configured to attach to the tube end 44 of the forward end 38 of the exhaust finisher 34 via mechanical fasteners (not shown), such as screws, staples or rivets. More specifically, the second end 52 fits around the tube end 44 as a sleeve. Alternatively, a conventional ring or strap clamp C (shown in FIG. 2) can be used to fix the second end 52 to the cylindrically shaped projection 44 of the forward end 38 of the exhaust finisher 12.

The flexible portion 5L extends from the from end 50 to the second end 52. The flexible portion 54 is shaped as an accordion-like bellows that is elastically deformable such that the first end 50 and the second end 52 are movable relative to one another.

Specifically, as the engine (not shown) al the vehicle 10 warms up, the exhaust system 30 can undergo thermal expansion and once the engine is shut off, the exhaust system 30 can undergo thermal contraction. Depending upon the overall design of the exhaust system 30, in a cooled state, the exhaust system 30 can be a first overall length, and in a heated state can be a second overall length greater than the first overall length. Hence, as the exhaust system 30 undergoes thermal expansion and contraction, the exhaust pipe 32 can move relative to the exhaust finisher 12. One characteristic of the overall design of the boot 34 is that the flexible portion 54 changes its shape in response to the thermal expansion and contraction of the exhaust system 30 or from relative movement between the exhaust pipe and the exhaust finisher resulting from, for example, rough road conditions.

Specifically, FIG. 5 shows the exhaust system 30 and the boot 34 in a cooled, or ambient temperature state where the exhaust system 30 is exhibits its first overall length. Hence, in FIG. 5, the boot 34 is flexed with the flexible portion 54 in an expanded state with the first end 50 moved away from the second end 52 of the boot 34, and with the first end 50 moved away from the exhaust finisher 12. In contrast, FIG. 6 shows the exhaust system 30 and the boot 34 in the 10 show exhaust system 30 and the boot 34 in an operating state where the engine (not shown) and the exhaust system 30 of the vehicle 10 are fully warmed up. Hence, in FIG. 6, the exhaust system 30 has undergone thermal expansion and is at is second overall length. Consequently, in FIG. 6, the flexible portion 54 of the boot 34 is compressed such that the first end 50 moved toward the second end 52 of the boot 34 and the first end 50 moved toward, the exhaust finisher 12.

Figure 7:
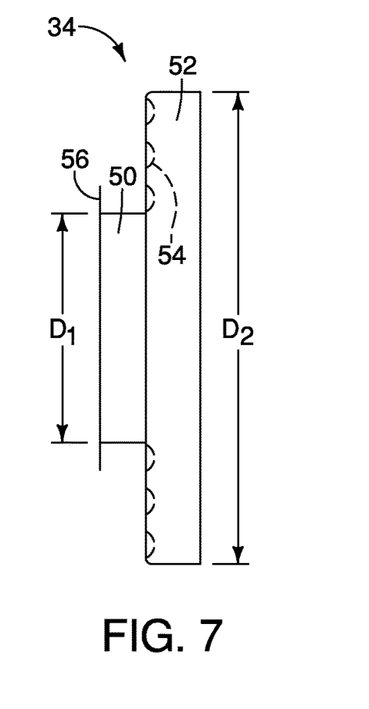
FIG. 7 is a side view of the hoot removed from the vehicle showing a first end, a second end and a flexible portion in a compressed state (corresponding to a heated state) in accordance with the first embodiment.
Figure 8:
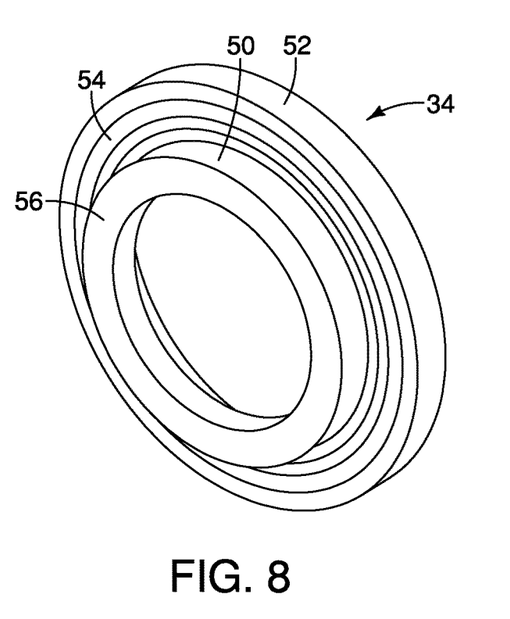
FIG. 8 is a perspective view of the boot removed from the vehicle showing the first end, the second end and the flexible portion in the compressed state (corresponding to the heated state) in accordance with the first embodiment.
Figure 9:
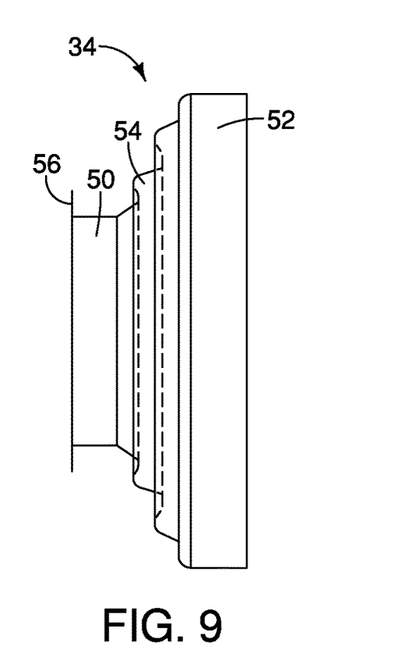
FIG. 9 is another side view of the boot similar to FIG. 7 showing the first end, the second end and the flexible portion in an elongated state (corresponding to an ambient temperature state) in accordance with the first embodiment.
Figure 10:
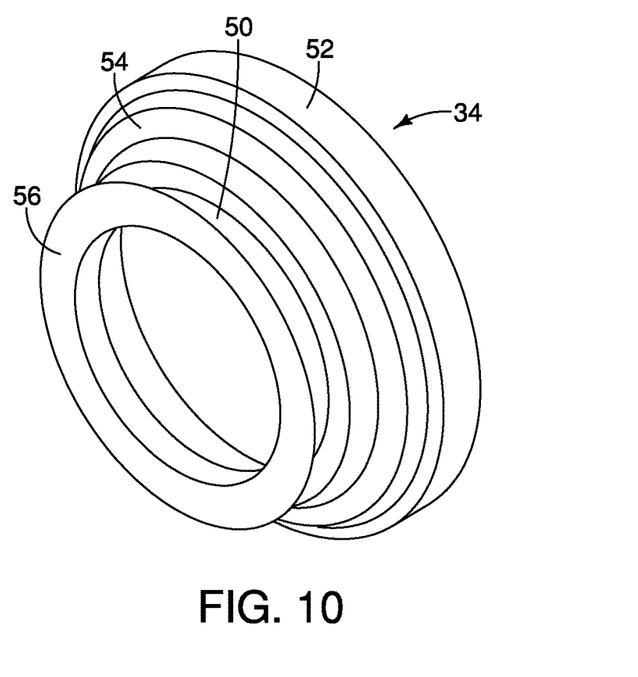
FIG. 10 is another perspective view of the boot similar to FIG. 10 showing the first end, the second end and the flexible portion in the elongated state (corresponding to the ambient temperature state) in accordance with the first embodiment.

FIGS. 7 and 8 show the boot 34 compressed (corresponding to FIG. 6 with the exhaust system 30 having undergone thermal expansion-hot), while FIGS. 9 and 10 show the boot 34 expanded (corresponding to FIG. 5 with the exhaust system 30 cooled off and having undergone thermal contraction.

The boot 34 provides several advantage and benefits to the exhaust system 30. For example, the boot 34 can provide a sealed connection between the exhaust pipe 32 and the exhaust finisher 12. However, in contrast, the boot 34 can be provided with fresh air inlets, and need not provide a seal between the exhaust pipe 32 and the exhaust finisher 12, as is explained below in further embodiments.

Another advantage or benefit is that the boot 34 blocks any view of the underside of the vehicle 10 through the openings 42 of the exhaust finisher 12. Specifically, when a person looks into the exhaust finishers 12, as is possible in FIG. 1, in the absence of the boot 34, it is possible to see the underside of the vehicle 10 in a gap defined between the exhaust pipe 32 and the forward end 38 of the exhaust finisher 12. Inclusion of the boot 34 obscures such a view thereby providing the vehicle 10 with a more appealing view from the rear (as in FIG. 1).

Second Embodiment

Referring now to FIGS. 11-14, a boot 34 in accordance with a second embodiment will now be explained. In view of the similarity between the first and second embodiments, the parts of the second embodiment that are, identical to the parts of the first embodiment will be, given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

Figure 11:
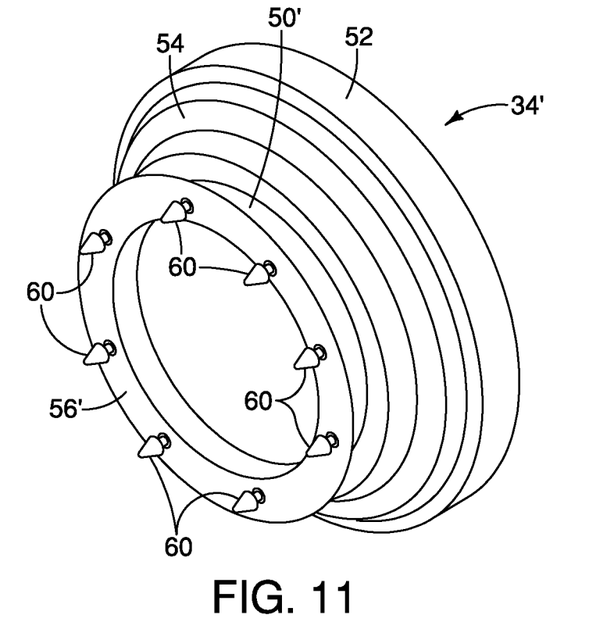
FIG. 11 is a perspective view of a modified boot with a first end of the boot having a second annular flange with a plurality of projections extending therefrom to accordance with a second embodiment.

The boot 34' is similar to the boot 34 of the first embodiment. The boot 34' includes a first end 50', the second end 52 and the flexible portion 54. The second end 52 and the flexible portion 54 are as described above with respect to the first embodiment. The first end 50' is similar to the first end 50. However, the first end 50' includes a second annular flange 56' that has been modified, as compared to the second annular flange 56 of the first embodiment. Specifically, the second annular flange 56' includes a plurality of projections 60.

Figure 12:
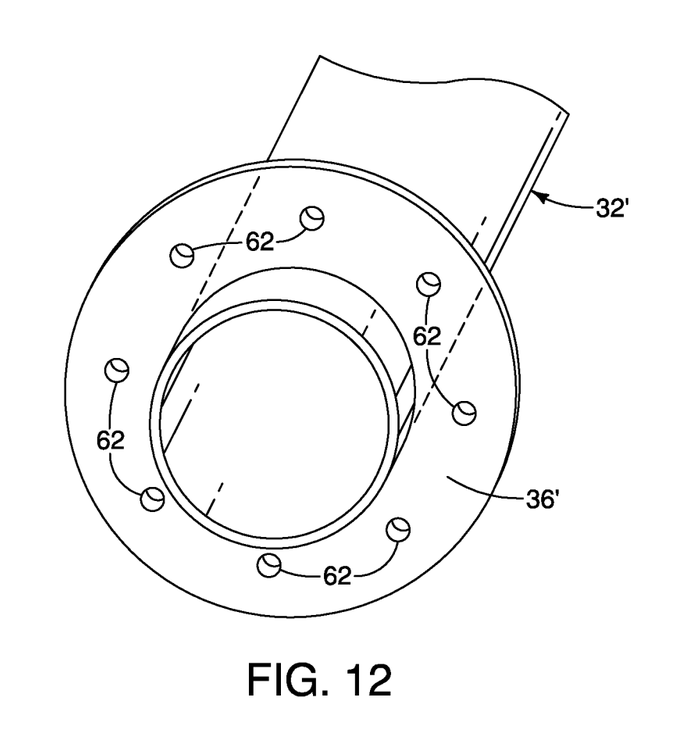
FIG. 12 is a perspective view of a rearward end of an exhaust pipe showing a first annular flange extending radially outward therefrom, the first annular flange having a plurality of openings in accordance with the second embodiment.

The projections 60 of the second annular flange 56' of the boot 34' connect to openings 62 formed in a first annular flange 36' of an exhaust pipe 32'. The exhaust pipe 32' is identical to the exhaust pipe 32 of the first embodiment, except that the first annular flange 36' includes the openings 62. Otherwise, the first annular flange 36' is identical to the first annular flange 36 of the first embodiment.

Figure 13:
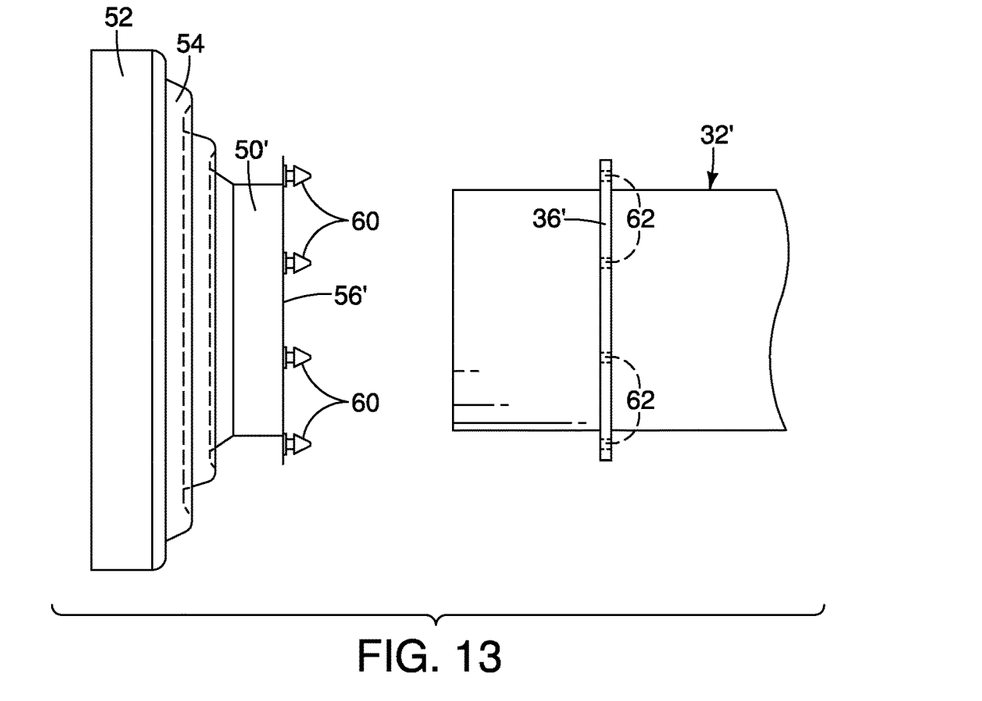
FIG. 13 is a side view of the rearward end of the exhaust pipe showing the openings of the first annular flange aligned with the projections of the second annular flange of the boot in accordance with the second embodiment.
Figure 14:
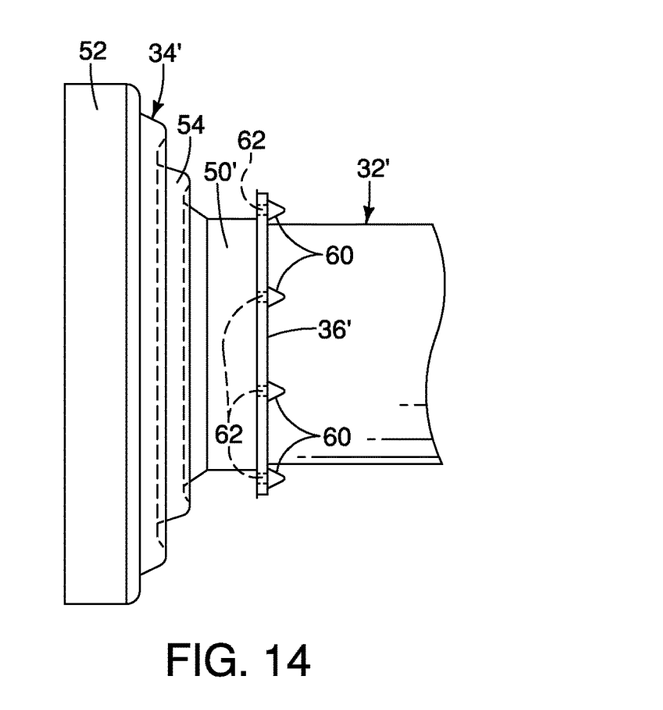
FIG. 14 is another side view of the exhaust pipe and the boot showing the projections of the second annular flange of the boot inserted through the openings of the first annular flange of the exhaust pipe in accordance with the second embodiment.

The projections 60 are inserted into the openings 62 and fix the boot 34' to the exhaust pipe 32'. The projections 60 can be snap-fitting projections that are forced through the openings 62. The projections 60 are compressed when forced into the openings 62 and expand one through the openings 62. Alternatively, the projections 60 can be deformed after insertion into the openings 62, thereby fixing the boot 34' to the exhaust pipe 32'.

Third Embodiment

Figure 15:
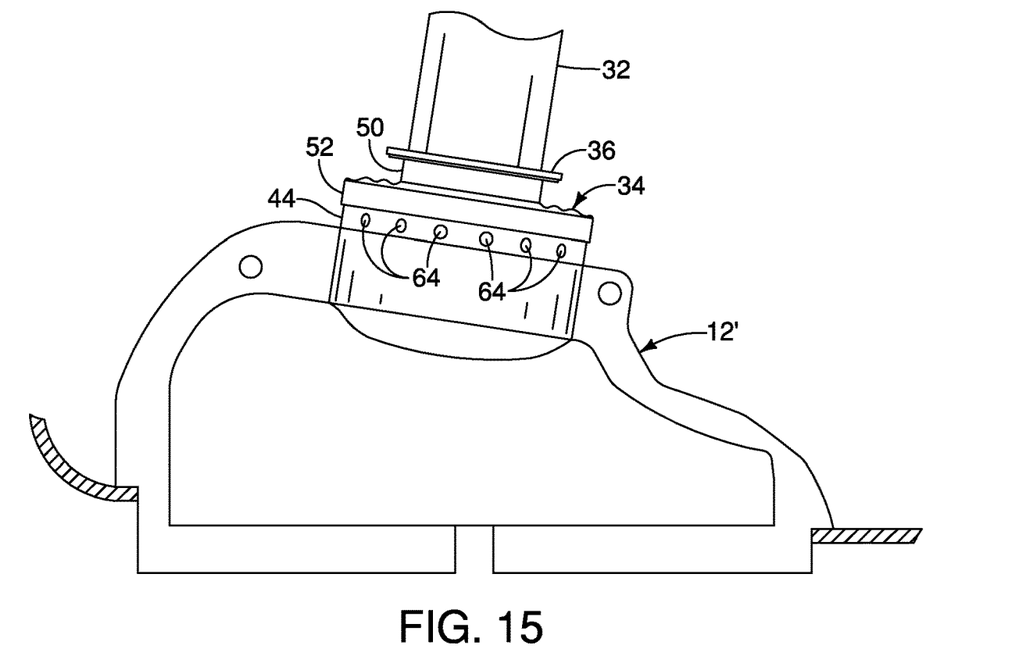
FIG. 15 is a top view of the rearward end of the exhaust pipe, the boot and an exhaust finisher, with a forward end of the exhaust finisher having a plurality of fresh air inlet openings forward from the second end of the boot in accordance with a third embodiment.
Figure 16:
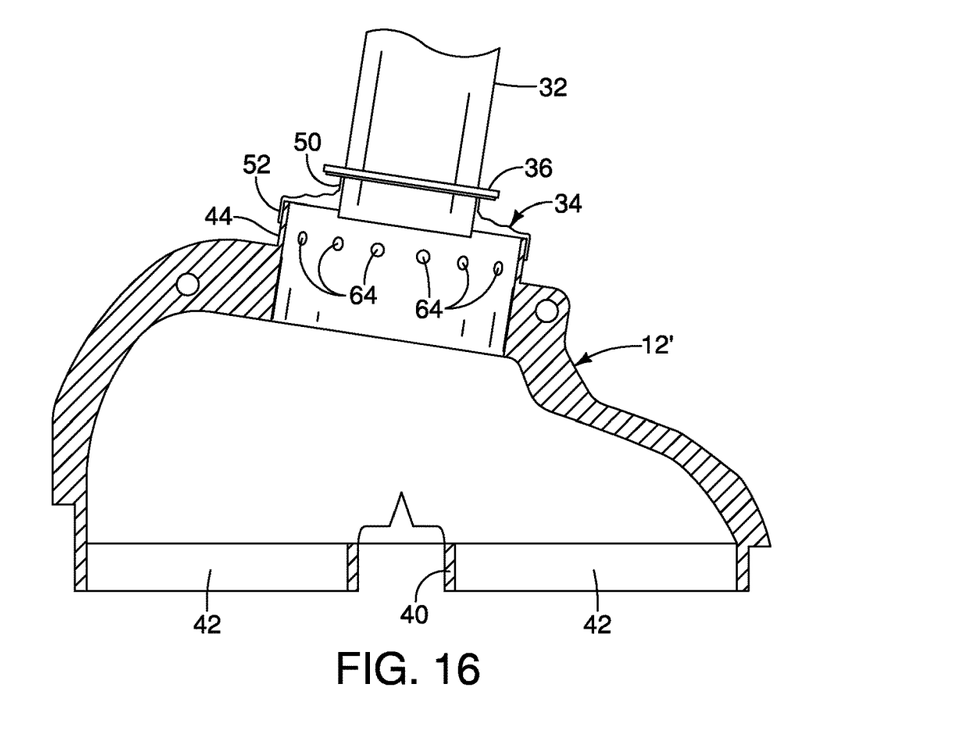
FIG. 16 is a cross-sectional top view of the rearward end of the exhaust pipe, the boot and the exhaust finisher, showing the plurality of fresh air inlet openings in accordance with the third embodiment.

Referring now to FIGS. 15-16, an exhaust finisher 12' in accordance with a third embodiment will now be explained. In, view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (').

The exhaust finisher 12' is identical to the exhaust finisher 12 of the first embodiment, except that the cylindrically shaped projection 44 of the first embodiment has been modified. Specifically, a cylindrically shaped projection 44' of the exhaust finisher 12 includes a plurality of fresh an inlet openings 64 that not covered by the second end 52 of the boot 34 with the boot 34 installed to the exhaust finisher 12'.

With the engine (not shown) of the vehicle 10 operating, but exhaust gases are forced out of the exhaust pipe 32. As those gases pass through the boot 34 and into the exhaust finisher 12', fresh air is, drawn into the exhaust finisher 12' through the openings 64 mixing with the exhaust gases.

Fourth Embodiment

Figure 17:
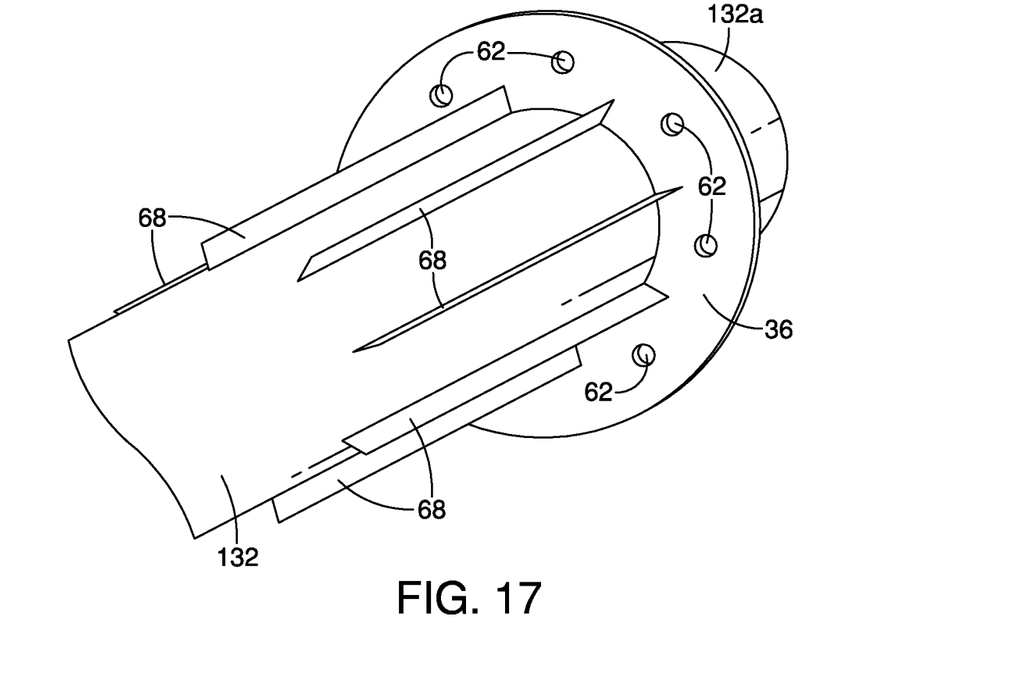
FIG. 17 is a perspective view of an exhaust pipe that includes a plurality of heat dissipation fins in accordance with a fourth embodiment.

Referring now to FIG. 17, an exhaust pipe 132 in accordance with a fourth embodiment will now be explained, in view of the similarity between the first and fourth embodiments the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The exhaust pipe 132 is identical to the exhaust pipe 12 of the first embodiment, except that the exhaust pipe 132 includes a plurality of heat dissipating fins 68 that extend forward from the first annular flange 36 and away from a rearward end 132a. The first end 50 (not shown in FIG. 1) attaches to the rearward end 132a of the exhaust pipe 132.

Fifth Embodiment

Figure 18:
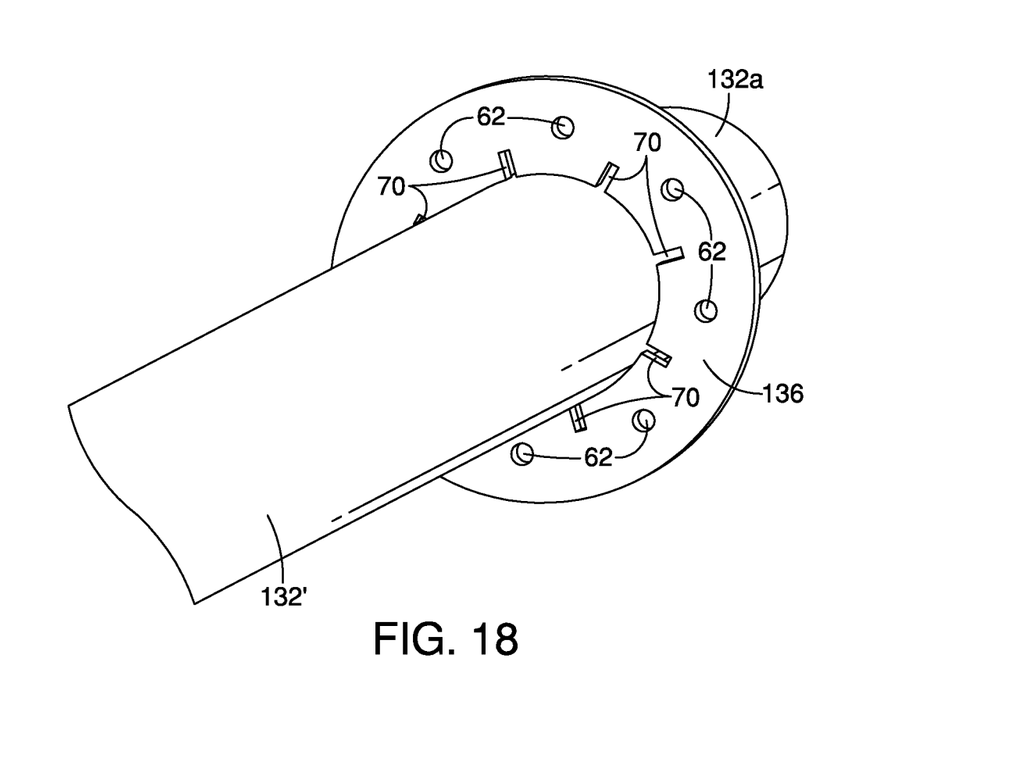
FIG. 18 is a perspective view of an exhaust pipe with a first annular flange that includes a plurality of heat dissipation air openings m accordance with a fifth embodiment.

Referring now to FIG. 18, an exhaust pipe 132' in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment, may be omitted for the sake of brevity. The parts of the fifth embodiment that differ from the parts of the first embodiment will be indicated with a single prime (').

The exhaust pipe 132' is identical to the exhaust pipe 32 of the first embodiment, except a first annular flange 136 has been modified, as compared to the first annular flange 36 of the first embodiment. Specifically, the first annular flange 136 of the exhaust pipe 132' includes a plurality of air channels 70, or openings, that assist in dissipation of heat from the exhaust pipe 132'.

Sixth Embodiment

Figure 19:
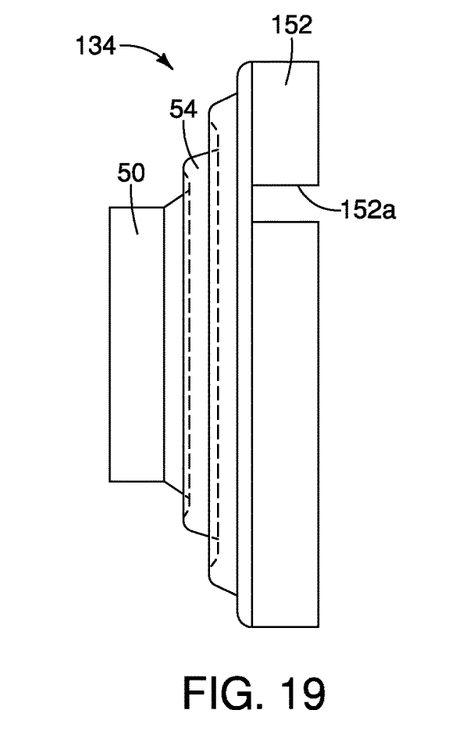
FIG. 19 is a side view of a boot showing a second end of the boot with a notch or recess that facilitates easy installation to the exhaust finisher in accordance with a sixth embodiment.
Figure 20:
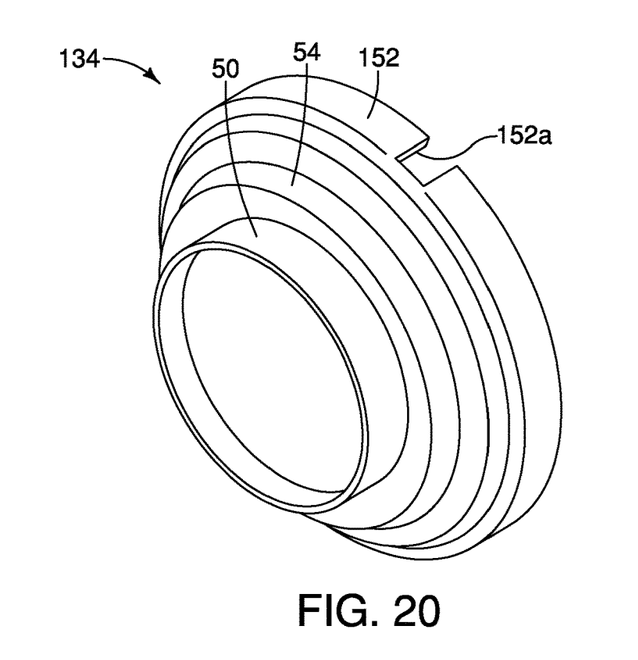
FIG. 20 is a perspective view of the boot depicted in FIG. 19, showing the notch or recess in the second end of the boot that facilitates easy installation to the exhaust finisher in accordance with the sixth embodiment.

Referring now to FIGS. 19-20, a boot 134 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

The boot 134 is identical to the boot 34 of the first embodiment, except a second end 152 of the boot 34 has been, modified, as compared to the second end 52 of the first embodiment. Specifically, the second end 152 includes gap or cutaway 152a that can make installation of the second end 152 to the exhaust finisher 12 (not shown in FIGS. 19-20) easier since the second end 152 can temporarily expand in overall diameter during installation.

Seventh Embodiment

Figure 21:
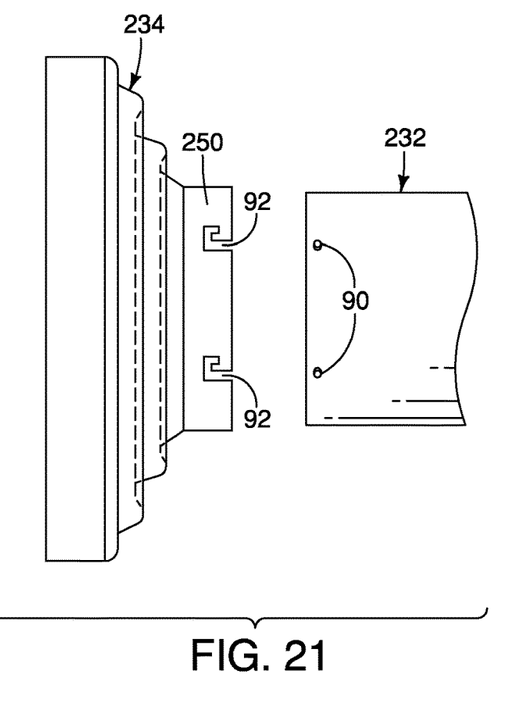
FIG. 21 is a side view of all exhaust pipe that includes pins or protrusions that align with hook shaped recesses in a second end of a boot in accordance with a seventh embodiment.
Figure 22:
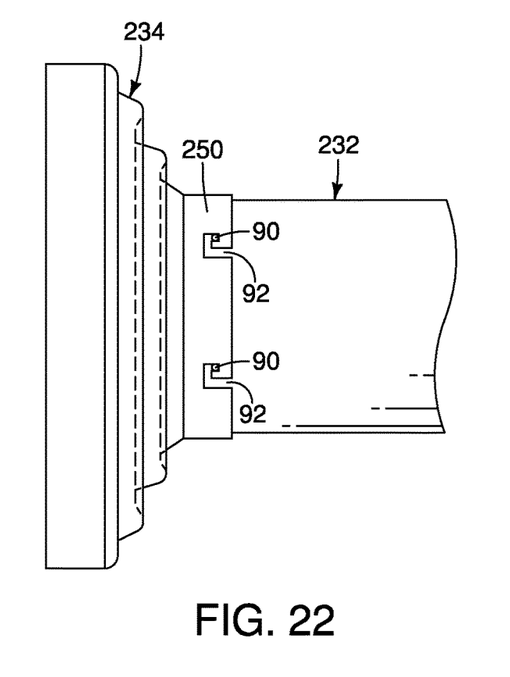
FIG. 22 is another side s of the exhaust pipe and its pins or protrusions installed within the hook shaped recesses in the second end of the boot in accordance with the seventh embodiment.

Referring now to FIGS. 21-22, an exhaust pipe 232 and a boot 234 in accordance with a seventh embodiment will now be explained. In view of the similarity between the first and seventh embodiments, the parts of the seventh embodiment that are identical to the parts of the first embodiment will be given the same reference numerals as the parts of the first embodiment. Moreover, the descriptions of the parts of the seventh embodiment that are identical to the pails of the first embodiment may be omitted for the sake of brevity.

The exhaust pipe 232 is identical to the exhaust pipe 32 of the first embodiment, except that a plurality of pins 90 have been attached, formed with or welded thereto. The pins 90 extend radially outward from the exhaust pipe 232 and are spaced apart from one another by a predetermined distance, as explained below.

The boot 234 is identical to the boot 34 of the first embodiment, except a first end 250 of the boot 234 has been modified, as compared to the first end 50 of the boot 34 of the first embodiment. Specifically, the first end 250 includes a plurality of hook-shaped slots 92 that are dimensioned to receive corresponding ones of the plurality of pins 90 of the exhaust pipe 232. As shown in FIG. 21, the hook-shaped slots 92 align with the pins 90. Once the first end 250 is slid onto the exhaust pipe 232, the pins 90 slide into the hook-shaped slots 92, the boot 234 is rotated a few degrees and pulled slightly, the pins 90 and the hook-shaped slots 92 lock the boot 234 to the rear end of the exhaust pipe 232 and the exhaust assembly.

Eighth Embodiment

Referring now to FIGS. 21-22, an exhaust pipe 232 and a boot 234 in accordance with an eighth embodiment will now be explained, in view of the similarity between the first and eighth embodiments, the parts of the eighth embodiment that are identical to the parts of the first embodiment will be given the same reference numerals as the parts of the first embodiment. Moreover, the descriptions of the parts of the eighth embodiment that are identical to the parts of the first embodiment may be omitted for the sake of brevity.

Figure 23:
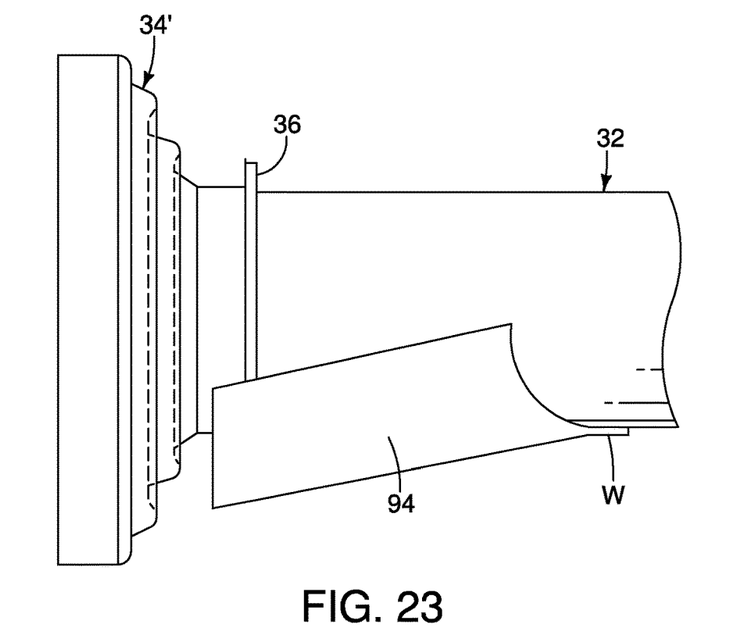
FIG. 23 is a side view of an exhaust pipe with the boot attached thereto, the exhaust pipe having an aero shield fixed thereto in accordance with an eighth embodiment.
Figure 24:
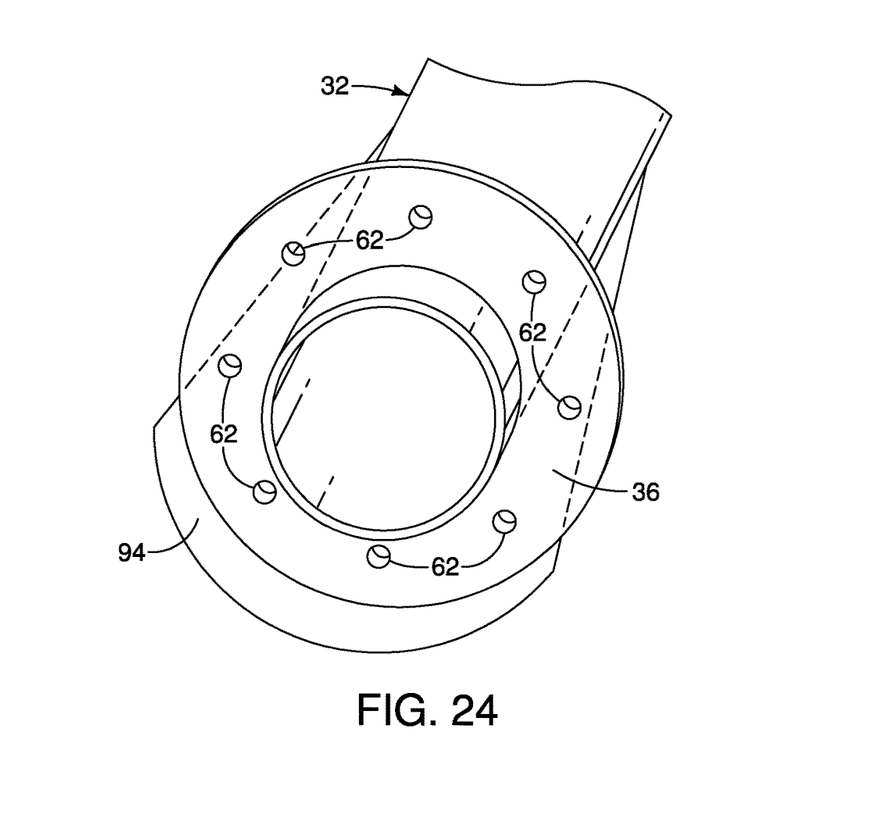
FIG. 24 is a perspective view of the exhaust pipe with the boot removed, the exhaust pipe showing further details of, the aero shield in accordance with the eighth embodiment.

The exhaust pipe 32 is identical to the exhaust pipe 32 of the first embodiment, except that an aero shield 94 has been welded via a welding flange W to an exterior surface of the exhaust pipe 32 at a location forward from the first annular flange 36. The shield 94 provides protection for the boot 34 in the event that debris should be heading toward the boot 34 while the vehicle 10 is in motion. The aero shield 94 also has sufficient surface area to assist in the dissipation heat.

The various structural elements of the vehicle 10 (other than the boot 34 and related portions of the exhaust system 30) are conventional components that are well known in the art. Since these vehicle elements are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle exhaust system. Accordingly, these terms, as utilized to describe the present invention should be interpreted relative to a vehicle equipped with the vehicle exhaust system.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose at limiting the invention as defined by the appended claims and their equivalents.

What is claimed is:

1. A vehicle exhaust system, comprising:
    a vehicle body structure;
    an exhaust assembly supported to an underside of the vehicle body structure;
    a rear bumper assembly supported to the vehicle body structure;
    an exhaust finisher fixedly and non-movably attached to one of the vehicle body structure and the rear bumper assembly, the exhaust finisher extending at least part way through an opening of the rear bumper assembly; and
    a boot having a first end, a second end and a flexible portion, the first end being attached to a rear end of the exhaust assembly, the second end being attached to a forward end of the exhaust finisher and the flexible portion extending from the front end to the second end, the flexible portion being elastically deformable in response to thermal expansion and contraction of the exhaust assembly.

2. The vehicle exhaust system according to claim 1, wherein
    the flexible portion of the boot includes an accordion-like bellows such that the first end and the second end are movable relative to one another.

3. The vehicle exhaust system according to claim 1, wherein
    the first end of the boot has a circular shape defining a first diameter and the second end of the boot has a circular shape defining a second diameter, with the second diameter being larger than the first diameter.

4. The vehicle exhaust system according to claim 1, wherein
    the rear end of the exhaust assembly includes a first annular flange that extends radially outward therefrom, and
    the first end of the boot includes a second annular flange that extends radially outward therefrom, the first annular flange and the second annular flange being dimensioned to mate with one another.

5. The vehicle exhaust system according to claim 4, wherein
    the first annular flange includes a plurality of openings and the second annular flange includes a plurality of projections oriented to insert into corresponding ones of the plurality of openings in the first annular flange attaching the first annular flange to the second annular flange.

6. The vehicle exhaust system according to claim 5, wherein
    the first annular flange includes a plurality of first openings and the second annular flange includes a plurality of second openings that align with corresponding ones of the plurality of first openings such that mechanical fasteners inserted through corresponding ones of the first and second openings fix the first annular flange to the second annular flange.

7. The vehicle exhaust system according to claim 4, wherein
    the rear end of the exhaust assembly further includes a plurality of fresh air inlet openings forward of the first annular flange.

8. The vehicle exhaust system according to claim 4, wherein
    the rear end of the exhaust assembly further includes a plurality of cooling fins that extends from the first annular flange in a vehicle forward direction.

9. The vehicle exhaust system according to claim 1, wherein
    the rear end of the exhaust assembly includes a plurality of pins extending radially outward from an outer surface thereof, with the first end of the boot being dimensioned to extend around a section of the rear end of the exhaust assembly, the first end of the boot having a plurality of hook-shaped slots dimensioned to receive corresponding ones of the plurality of pins locking the boot to the rear end of the exhaust assembly.

10. The vehicle exhaust system according to claim 1, wherein
    the first end of the boot is dimensioned to extend around a section of the rear end of the exhaust assembly, with an O-ring clamp installed around the first end of the boot clamping the first end to the section of the rear end of the exhaust assembly.

11. The vehicle exhaust system according to claim 1, wherein
    the forward end exhaust finisher includes an elongated tube section with the second end of the boot being attached thereto, the elongated tube section including a plurality of fresh air inlet openings located adjacent to a rearward-most end of the second end of the boot.

12. The vehicle exhaust system according to claim 1, wherein
    the boot is made of one of a group selected from the following materials: a sheet metal material, a metallic foil material and a flexible heat resistant polymer material.

13. The vehicle exhaust system according to claim 1, wherein
    the first end, the second end and the flexible portion of the boot are made as a single, unitary, monolithic element.

14. A vehicle exhaust system, comprising:
    a boot having a first end, a second end and a flexible portion, the first end being configured to attach to a rear end of an exhaust pipe, the second end being configured to attach to a forward end of an exhaust finisher and the flexible portion extending from the front end to the second end, the flexible portion being an accordion-like bellows that is elastically deformable such that the first end and the second end are movable relative to one another, the first end of the boot having a circular shape defining a first diameter and the second end of the boot having a circular shape defining a second diameter, with the second diameter being larger than the first diameter;
    an exhaust pipe having a rear end; and
    an exhaust finisher having a front end such that with the exhaust pipe having undergone thermal expansion and being at an engine operating temperature, the rear end of the exhaust pipe extends into the front end of the exhaust finisher with the second end of the boot being connected to the front end of the exhaust finisher and the first end of the boot being connected to the rear end of the exhaust pipe.

15. The vehicle exhaust system according to claim 14, wherein the boot is made of one of a group selected from the following materials: a sheet metal material, a metallic foil material and a flexible heat resistant polymer material.

16. The vehicle exhaust system according to claim 14, wherein the first end, the second end and the flexible portion of the boot are made as a single, unitary, monolithic element.

\* \* \* \* \*